US011740173B2

(12) United States Patent
Denbeaux (10) Patent No.: US 11,740,173 B2
(45) Date of Patent: Aug. 29, 2023

(54) SYSTEMS AND METHODS FOR DETECTING PARTICLES

(71) Applicant: The Research Foundation for the State University of New York, Albany, NY (US)

(72) Inventor: Gregory Denbeaux, Albany, NY (US)

(73) Assignee: University of New York, Albany, NY (US)

( * ) Notice: Subject to any disclaimer, the term of this patent is extended or adjusted under 35 U.S.C. 154(b) by 256 days.

(21) Appl. No.: 17/335,862

(22) Filed: Jun. 1, 2021

(65) Prior Publication Data

US 2021/0372915 A1   Dec. 2, 2021

Related U.S. Application Data

(60) Provisional application No. 63/031,948, filed on May 29, 2020.

(51) Int. Cl.
*G01N 15/10* (2006.01)
*G01N 1/40* (2006.01)
*G01N 15/00* (2006.01)

(52) U.S. Cl.
CPC .......... *G01N 15/10* (2013.01); *G01N 1/4022* (2013.01); *G01N 2015/0019* (2013.01); *G01N 2015/0038* (2013.01); *G01N 2015/0046* (2013.01); *G01N 2015/1062* (2013.01)

(58) Field of Classification Search
CPC .......... G01N 1/36; G01N 1/4022; G01N 1/44; G01N 15/02; G01N 15/10; G01N 2015/0019; G01N 2015/0038; G01N 2015/0046; G01N 2015/1062; G01N 2015/1087; G01N 2015/1486; G01N 2015/1493
See application file for complete search history.

(56) References Cited

U.S. PATENT DOCUMENTS

2014/0001031 A1*  1/2014  Quesnel .............. H01J 37/3458
                                                    977/890
2017/0212030 A1*  7/2017  Hasegawa .............. G01N 21/53

* cited by examiner

*Primary Examiner* — Jennifer Wecker
(74) *Attorney, Agent, or Firm* — Lance Reich; Peter Fallon; Austin Winter (57) ABSTRACT

Systems for detecting, capturing, and/or measuring nanoparticles. The system may include a first vacuum chamber, where nanoparticles are formed inside a first cavity of the first vacuum. The system may also include a second vacuum chamber in fluid communication with the first vacuum chamber, a particle collection component positioned within a second cavity of the second vacuum chamber, and a particle collection medium disposed over the particle collection component. Additionally, the system may include a particle counter in fluid communication with the second vacuum chamber, and a control system operably coupled to the component. The control system may be configured to aerosolize the nanoparticles by adjusting a temperature of the component to a first temperature that establishes the medium in the solid phase, and adjusting the temperature of the component to a second temperature to transition the medium from the solid phase to a gaseous phase.

9 Claims, 9 Drawing Sheets

```
┌─────────────────────────────┐
│  ENCAPSULATE PARTICLES IN   │
│   VACUUM CHAMBER USING      │──P1
│  PARTICLE COLLECTION MEDIUM │
└─────────────────────────────┘
              │
              ▼
┌─────────────────────────────┐
│   TRANSFER ENCAPSULATED     │
│   PARTICLES FROM VACUUM     │──P2
│         CHAMBER             │
└─────────────────────────────┘
              │
              ▼
┌─────────────────────────────┐
│  MEASURE/COUNT TRANSFERRED  │──P3
│         PARTICLES           │
└─────────────────────────────┘
```

FIG. 9

SYSTEMS AND METHODS FOR DETECTING PARTICLES

CROSS-REFERENCE TO RELATED APPLICATIONS

This application claims priority to U.S. provisional application No. 63/031,948 filed on May 29, 2020, the content of which is hereby incorporated by reference into the present application

BACKGROUND

The disclosure relates generally to particle detection, and more particularly, to systems and methods for detecting, capturing, and/or measuring nanoparticles.

There is a need for counting nanoparticles in vacuum chambers, especially process chambers for semiconductor manufacturing. With the industry working on the 5 nanometer (nm) node, particles on the ~10 nm scale and larger that adhere to the silicon wafer can become defects affecting the yield of the process. There is no existing in-situ particle counter available below about 50-100 nm size, significantly higher than the size that would affect yields of the process. The basic approach to counting nanoparticles is light scattering, but the scattering of light scales dramatically with the size of the particle, approximately one millionth as much light scatters from a particle if the diameter is reduced by a factor of 10.

Conventional methods of detection of particles in the semiconductor process is based on counting the particles that adhere to the wafers passing through the tool. That detection is somewhat easier since the particles are stationary on the wafer, but still it is a challenge to detect particles below about 20 nm. For that current method to be used, it means that particle counting is only after the particles have adhered to wafers and only after the wafers have passed through the process tool and eventually to the inspection tool. Any delays in that process during an excursion of a process tool could lead to many wafers being affected. Avoiding that issue requires a larger number of inspections to reduce the delay before identification of an issue.

Furthermore, in order to avoid any tool excursions, it is expected that many maintenance tasks and wear component replacements are completed before there is an issue. The presence of a real time monitor of particles within process tools could be used to monitor the tool defectivity and perform maintenance only when needed, or at least with better data to decide when to perform maintenance.

In order to do real time monitoring of nanoparticles in the size range of interest within a vacuum tool, either a high power laser would be needed at large expense in order to overcome the small amount of scattering, or, the nanoparticles would need to be removed from the vacuum environment in order to take advantage of external particle detection methods and mechanisms.

BRIEF DESCRIPTION

A first aspect of the disclosure provides a particle detection system. The system includes a first vacuum chamber including a first cavity, wherein a plurality of nanoparticles are formed inside the first cavity of the first vacuum; a second vacuum chamber in fluid communication with the first vacuum chamber, the second vacuum chamber including a second cavity; a particle collection component positioned within the second cavity of the second vacuum chamber, the particle collection component including a first surface; a particle collection medium disposed over the first surface of the particle collection component, the particle collection medium in a solid phase encapsulating the plurality of nanoparticles as the plurality of nanoparticles travel to the second vacuum chamber from the first vacuum chamber; a particle counter in fluid communication with the second vacuum chamber; and a control system operably coupled to the particle collection component, the control system configured to aerosolize the plurality of nanoparticles by: adjusting a temperature of the particle collection component to a first temperature, the first temperature establishing the particle collection medium in the solid phase; and adjusting the temperature of the particle collection component to a second temperature, the second temperature transitioning the particle collection medium from the solid phase to a gaseous phase.

A second aspect of the disclosure provides a particle detection system. The system includes: a first vacuum chamber including a first cavity, wherein a plurality of nanoparticles are formed inside the first cavity of the first vacuum; a particle collection component positioned within the first cavity of the first vacuum chamber; a particle collection medium in a liquid phase disposed on the particle collection component, the particle collection medium encapsulating the plurality of nanoparticles formed inside the first cavity of the first vacuum chamber; a second vacuum chamber in fluid communication with and positioned vertically below the first vacuum chamber, the second vacuum chamber including a second cavity; and a particle counter in fluid communication with the second vacuum chamber.

A third aspect of the disclosure provides a method for detecting particles. The method includes: encapsulating a plurality of particles in a vacuum chamber using a particle collection medium in one of a solid phase or a liquid phase; transferring the encapsulated particles from the vacuum chamber; and at least one of measuring or counting the transferred particles.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 1 shows a schematic view of system for detecting, capturing, and measuring particles using a solid/gaseous phase particle collection medium, according to embodiments of the disclosure.

FIG. 2 shows an enlarged view of a portion (P) of the system of FIG. 1 including a plurality of particles encapsulated in the solid phase particle collection medium, according to embodiments of the disclosure.

FIG. 3 shows an enlarged view of a portion (P) of the system of FIG. 1 including a plurality of aerosolized particles, according to embodiments of the disclosure.

FIG. 4 shows a schematic view of system for detecting, capturing, and measuring particles using a solid/gaseous phase particle collection medium, according to additional embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to particle detection, and more particularly, to systems and methods for detecting, capturing, and/or measuring nanoparticles.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
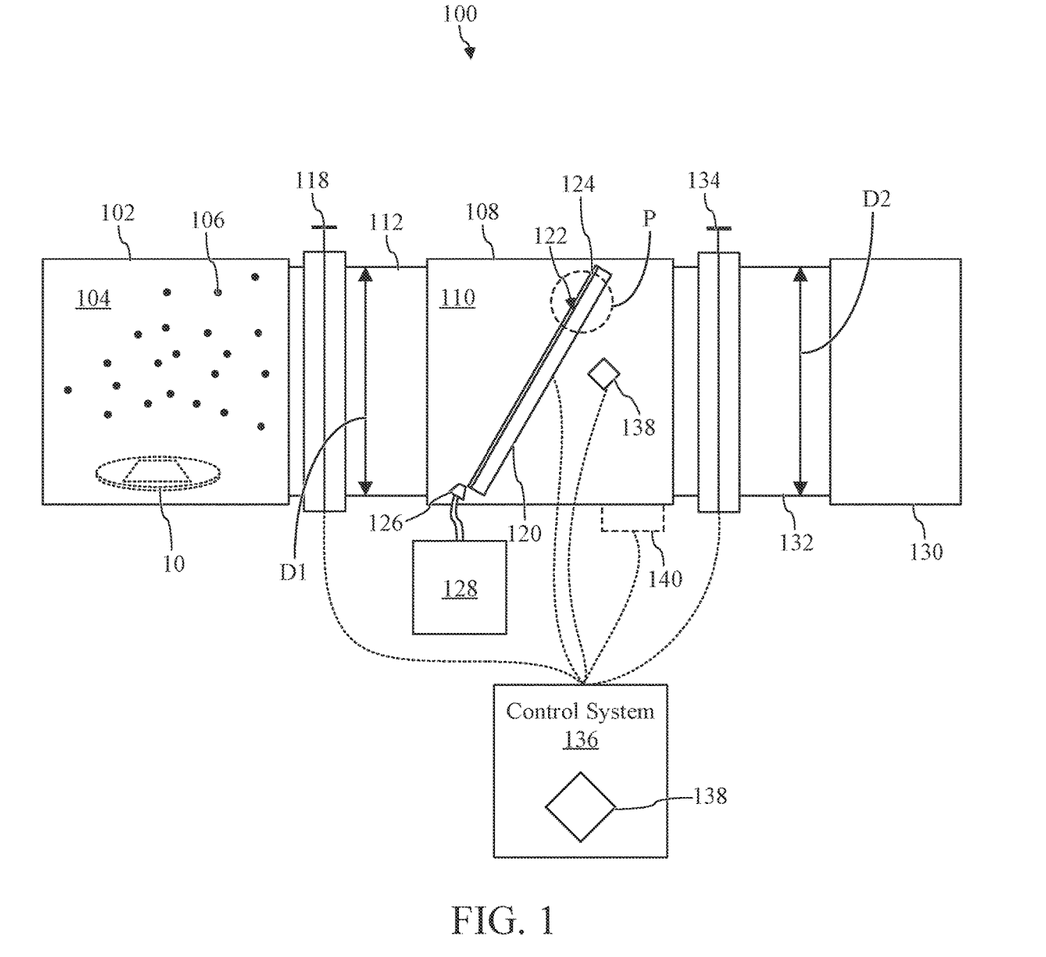

Turning to FIG. 1, a schematic view of a particle detection system 100 is shown. As discussed herein, particle detection system 100 (hereafter, "system 100") may use a solid phase/gaseous phase particle collection medium for detecting, capturing, and/or measuring particles. In the non-limiting example, system 100 may include a first vacuum chamber 102. First vacuum chamber 102 may include or define a first cavity 104. first vacuum chamber 102 may be any suitable chamber that may be used in manufacturing, building, cleaning, and/or sterilization processes for predetermined objects and/or components. For example, first vacuum chamber 102 may be formed as a build chamber used in the manufacturing of semiconductor devices and/or components 10 (shown in phantom). First vacuum chamber 102 may be formed from any suitable material based upon the use and/or purpose of the chamber within system 100, and that may maintain a vacuum or seal during operation, as discussed herein. In a non-limiting example, first vacuum chamber 102 may be formed substantially from metal or metal alloy.

As shown in FIG. 1, first vacuum chamber 102 may also include a plurality of particles or nanoparticles 106. More specifically, a plurality of nanoparticles 106 may be formed, disposed, positioned, and/or included in first cavity 104 of first vacuum chamber 102. The plurality of nanoparticles 106 may be formed and/or disposed within first cavity 104 of first vacuum chamber 102 as a result of, for example, based on interactions or actuations of components included within first vacuum chamber 102 and/or previously-deposited material flaking or being removed from surfaces. As discussed herein, nanoparticles 106 may remain in first cavity 104 of first vacuum chamber 102 until allowed and/or fluidly flowed, traveled, and/or transferred to distinct portions of system 100.

System 100 may also include a second vacuum chamber 108. Second vacuum chamber 108 may be in fluid communication with the first vacuum chamber 102. That is, and as shown in FIG. 1, second vacuum chamber 108 may be in fluid communication and/or may be fluidly coupled to first vacuum chamber 102. As discussed herein, second vacuum chamber 108 may receive the plurality of nanoparticles 106 from first vacuum chamber 102 of system 100. Similar to first vacuum chamber 102, second vacuum chamber 108 may include or define a second cavity 110. Second vacuum chamber 108 may be formed as a chamber used in system 100 for collecting and/or processing nanoparticles 106. Second vacuum chamber 108 may be formed from any suitable material that may maintain a vacuum or seal during operation and may aid in the collection/processing of nanoparticles 106, as discussed herein. In a non-limiting example, and similar to first vacuum chamber 102, second vacuum chamber 108 may be formed substantially from metal or metal alloy.

As shown in FIG. 1, first vacuum chamber 102 and second vacuum chamber 108 may be fluidly coupled via a first conduit 112. more specifically, first conduit 112 may be positioned between and may fluidly couple first vacuum chamber 102 and second vacuum chamber 108 in system 100. As discussed herein, during operation the plurality of nanoparticles 106 may flow from first vacuum chamber 102 to second vacuum chamber 108 through first conduit 112. First conduit 112 may include a predetermined size and/or dimension (D1). The predetermined dimension (D1) of first conduit 112 may be based on, at least in part, the size or dimension of first vacuum chamber 102 and/or second vacuum chamber 108. For example, the predetermined dimension (D1) a first conduit 112 may be substantially equal to or only slightly smaller (e.g., within 10%) then the dimension of first vacuum chamber 102 and/or second vacuum chamber 108. In other non-limiting examples, the predetermined dimension (D1) a first conduit 112 may be substantially smaller (e.g., less than half) the dimension of first vacuum chamber 102 and/or second vacuum chamber 108. Forming first conduit 112 to include the predetermined dimension (D1) may improve the flow of nanoparticles 106 between chambers 102, 108 and/or may prevent obstruction of nanoparticles 106 as they flow, travel, and/or transfer between chambers 102, 108 (e.g., undesirably sticking to sidewalls of conduit 112). First conduit 112 may be formed from any suitable material that may aid in the flowing of nanoparticles 106 from first vacuum chamber 102 to second vacuum chamber 108. For example, first conduit 112 may be formed substantially from metal or metal alloy.

System 100 may also include a first valve 118. First valve 118 may be positioned on and/or may be in fluid communication with first conduit 112. As such, first valve 118 may also be positioned or disposed between first vacuum chamber 102 and second vacuum chamber 108. As discussed herein, first valve 118 may regulate the flow of nanoparticles 106 between first vacuum chamber 102 and second vacuum chamber 108 when performing processes for detecting nanoparticles 106 within system 100. First valve 118 may be formed as any suitable valve or flow regulator device that may allow or prevent the flow or travel of nanoparticles from first vacuum chamber 102 to second vacuum chamber 108.

As shown in FIG. 1, system 100 may include a particle collection component 120 positioned within second vacuum chamber 108. more specifically, particle collection component 120 may be positioned or disposed within second cavity 110 of second vacuum chamber 108. In the non-limiting example shown in FIG. 1, particle collection component 120 may be angularly oriented within SEC vacuum chamber 108. in other non-limiting examples, particle collection component 120 may be vertically or horizontally oriented within second vacuum chamber 108. Additionally, and as shown in FIG. 1, particle collection component 120 may be positioned directly adjacent and/or may be substantially aligned with first conduit 112 of system 100. In the example, a first surface 122 of particle collection component 120 may be aligned with and/or exposed to first conduit 112. As discussed herein, first surface 122 of particle collection component 120 may be used to encapsulate nanoparticles 106 flowing and/or traveling from first vacuum chamber 102 to second vacuum Chamber of 108. Particle collection component 120 may be sized or dimensioned to substantially span over the entirety of second vacuum chamber 108 to aid in the encapsulation of nanoparticles 106. although a single particle collection component 120 is shown in FIG. 1, it is understood that system 100 may include a plurality of particle collection components. Particle collection component 120 may be formed from any suitable material that may include thermally conductive properties and/or characteristics (e.g., heating, cooling, freezing). For example, particle collection component 120 may be formed substantially from metal or metal alloys. As discussed herein, particle collection component 120 may be heated and/or cooled to aerosolize the plurality of nanoparticles 106.

A particle collection medium 124 may be disposed over particle collection component 120. More specifically, and as shown in FIG. 1, particle collection medium 124 may be disposed, formed, and/or positioned on first surface 122 of particle collection component 120. As such, particle collection medium 124 may also be positioned within second cavity 110 of second vacuum chamber 108. Particle collection medium 124 of system 100 may be used to encapsulate the plurality of nanoparticles 106, and subsequently aid in the aerosolization of nanoparticles 106 within seconds vacuum chamber 108, as discussed herein. When encapsulated nanoparticles 106 particle collection medium 124 may be in a solid phase or state. That is, particle collection medium 124 in a solid phase may encapsulate the plurality of nanoparticles 106 as nanoparticles 106 flow or travel to second vacuum chamber 108 from first vacuum chamber 102. Additionally, particle collection medium 124 may be in a gaseous phase or state, as a result of a sublimation process, when aerosolizing nanoparticles 106 and/or suspending nanoparticles 106 into second cavity 110 of second vacuum chamber 108. Particle collection medium 124 may be formed from any suitable material that may encapsulate nanoparticles 106 in a substantially solid phase, and may subsequently undergo a sublimation process (e.g., solid phase gaseous phase) to aerosolize nanoparticles 106 and be transformed into a gaseous phase. In the non-limiting example shown in FIG. 1, and as discussed herein, particle collection medium 124 may include and/or be formed from water vapor or as ice from water vapor. In another non-limiting example (see, FIG. 4), particle collection medium 124 may be formed as or may include a predetermined chemical compound that may undergo a sublimation process.

System 100 may also include a sprayer 126. Sprayer 126 may be positioned within second cavity 110 of second vacuum chamber 108. In a non-limiting example as shown in FIG. 1, sprayer 126 may also be positioned adjacent particle collection component 120. Sprayer 126 may be fluidly coupled with a supply reservoir 128. Supply reservoir 128 may contain, for example, a nonvolatile, particle free, gas or gaseous compound that may be provided within SEC vacuum chamber 108 during the detection process. That is, sprayer 126 may provide a gas included in supply reservoir 128 to second cavity 110 and/or a crossed particle collection component 120 during the detection process performed by system 100, as discussed herein. The gas provided by sprayer 126 may aid in the removal of nanoparticles 106 from particle collection medium 124 and/or may provide a force on aerosolized nanoparticles 106 suspended within second cavity 110. In non-limiting examples, the gas provided by sprayer 126 may include air, nitrogen (N), Argon (Ar), and any other similar material.

A particle counter 130 of system 100 may be positioned downstream of and/or in fluid communication with second vacuum chamber 108. That is, and as shown in FIG. 1, particle counter 130 may be fluidly coupled 2 and/or in fluid communication with second vacuum chamber 108 to receive aerosolized/suspended nanoparticles 106 formed within second vacuum chamber 108. Particle counter 130 may be formed as any suitable device, system, and/or apparatus that may detect, count, and/or measure aerosolized/suspended nanoparticles 106 flowing therethrough. In a non-limiting example, particle counter 130 may be capable of detecting, counting, and/or measuring nanoparticles 106 that are as small as approximately 2 nanometers (nm).

As shown in FIG. 1 second vacuum chamber 108 and particle counter 130 may be fluidly coupled via a second conduit 132. More specifically, second conduit 132 may be positioned between and may fluidly couple second vacuum chamber 108 and particle counter 130 in system 100. As discussed herein, during operation the plurality of aerosolized/suspended nanoparticles 106 may flow from second vacuum chamber 108 to particle counter 130 through second conduit 132. Similar to first conduit 112, second conduit 132 may include a predetermined size and/or dimension (D2). The predetermined dimension (D2) of second conduit 132 may be based on, at least in part, the size or dimension of second vacuum chamber 108 and/or particle counter 130. For example, the predetermined dimension (D2) of second conduit 132 may be substantially equal to or only slightly smaller (e.g., within 10%) then the dimension of second vacuum chamber 108 and/or particle counter 130. Forming second conduit 132 to include the predetermined dimension (D2) may improve the flow of aerosolized/suspended nanoparticles 106 between second vacuum chamber 108 and particle counter 130, and/or may prevent obstruction of aerosolized/suspended nanoparticles 106 as they flow within system 100 (e.g., undesirably sticking to sidewalls of conduit 132). Second conduit 132 may be formed from any suitable material that may aid in the flowing of aerosolized/ suspended nanoparticles 106 from second vacuum chamber 108 to particle counter 130. For example, second conduit 132 may be formed substantially from metal or metal alloy.

System 100 may also include a second valve 134. Second valve 134 may be positioned on and/or may be in fluid communication with second conduit 132. As such, second valve 134 may also be positioned or disposed between second vacuum chamber 108 and particle counter 130. As discussed herein, second valve 134 may regulate the flow of nanoparticles 106 between second vacuum chamber 108 and particle counter 130 when performing processes for detecting nanoparticles 106 within system 100. Second valve 134 may be formed as any suitable valve or flow regulator device that may allow or prevent the flow of nanoparticles from second vacuum chamber 108 to particle counter 130.

System 100 may also include a control system 136. Control system 136 may be a stand-alone system, or alternatively may be a portion and/or included in a larger computing device (not shown) of system 100. As discussed herein, control system 136 may be configured to control system 100 to aid in the operation of system 100 and/or aid in the detection of nanoparticles 106. As shown in FIG. 1, control system 136 may be in electronic communication with, operably coupled, and/or communicatively coupled to various devices, apparatuses, and/or portions of system 100. In non-limiting examples, control system 136 be hard-wired and/or wirelessly connected to and/or in communication with system 100, and its various components via any suitable electronic and/or mechanical communication component or technique. For example, control system 136 may be in electronic communication or operably coupled to particle collection component 120. Control system 136 may be in communication with particle collection component 120 to control/adjust the temperature of particle collection component 120 during the particle detection processes discussed herein. That is, and as discussed herein, control system 136 may either increase or decrease the temperature of particle collection component 120, and in turn increase or decrease the temperature of particle collection medium 124 included thereon, during the detection processes. Control system 136 may adjust the temperature of particle collection component 120 using any suitable device, apparatus, and/or system that may be configured to increase or decrease the temperature of thermally conductive particle collection component 120.

Control system 136 may also include at least one sensor 138. In the non-limiting example shown in FIG. 1, sensor 138 of control system 136 may be positioned within second cavity 110 of second vacuum chamber 108. Sensor 138 may detect a temperature of particle collection medium 124 directly, or alternatively may detect a temperature of particle collection component 120/second cavity 110 to determined or calculate the temperature of particle collection medium 124. Although one sensor 138 is shown in FIG. 1, it is understood that control system 136 may include more sensors in system 100. Sensor(s) 138 may be any suitable device or component to measure the temperature of particle collection medium 124, particle collection component 120, and/or second cavity 110. In a non-limiting example, sensor(s) 138 may be formed as a thermocouple for detecting at least one of the various temperatures discussed herein.

In the non-limiting example shown in FIG. 1, system 100 may also (optionally) include a heating/cooling device 140 formed outside of and adjacent to second vacuum chamber 108. That is, heating/cooling device 140 (shown in phantom as optional) may be positioned adjacent to or directly on second vacuum chamber 108, external to second cavity 110. Additionally as shown, control system 136 may be in electronic communication or operably coupled to heating/cooling device 140 to control the operation of device 140. In the non-limiting example, heating/cooling device 140 may heat or cool second vacuum chamber 108, which in turn may heat or cool particle collection component 120 and/or particle collection medium 124 during the detection process. Additionally, it is understood that heating/cooling device 140 may be positioned in a distinct location within system 100 than shown in FIG. 1. For example (not shown), heating/cooling device 140 may be positioned directly inside of second cavity 110 of second vacuum chamber 108.

Also shown in FIG. 1, control system 136 may be operably coupled to and/or in electronic communication with first valve 118 and/or second valve 134. Control system 136 may be operably coupled to first valve 118 and second valve 134 of system 100 to control the operation and/or function of valves 118, 134 during the detection process. That is, and as discussed herein, control system 136 may open or close first valve 118 and/or second valve 134 when performing the processes for detecting nanoparticles 106.

Figure 2:
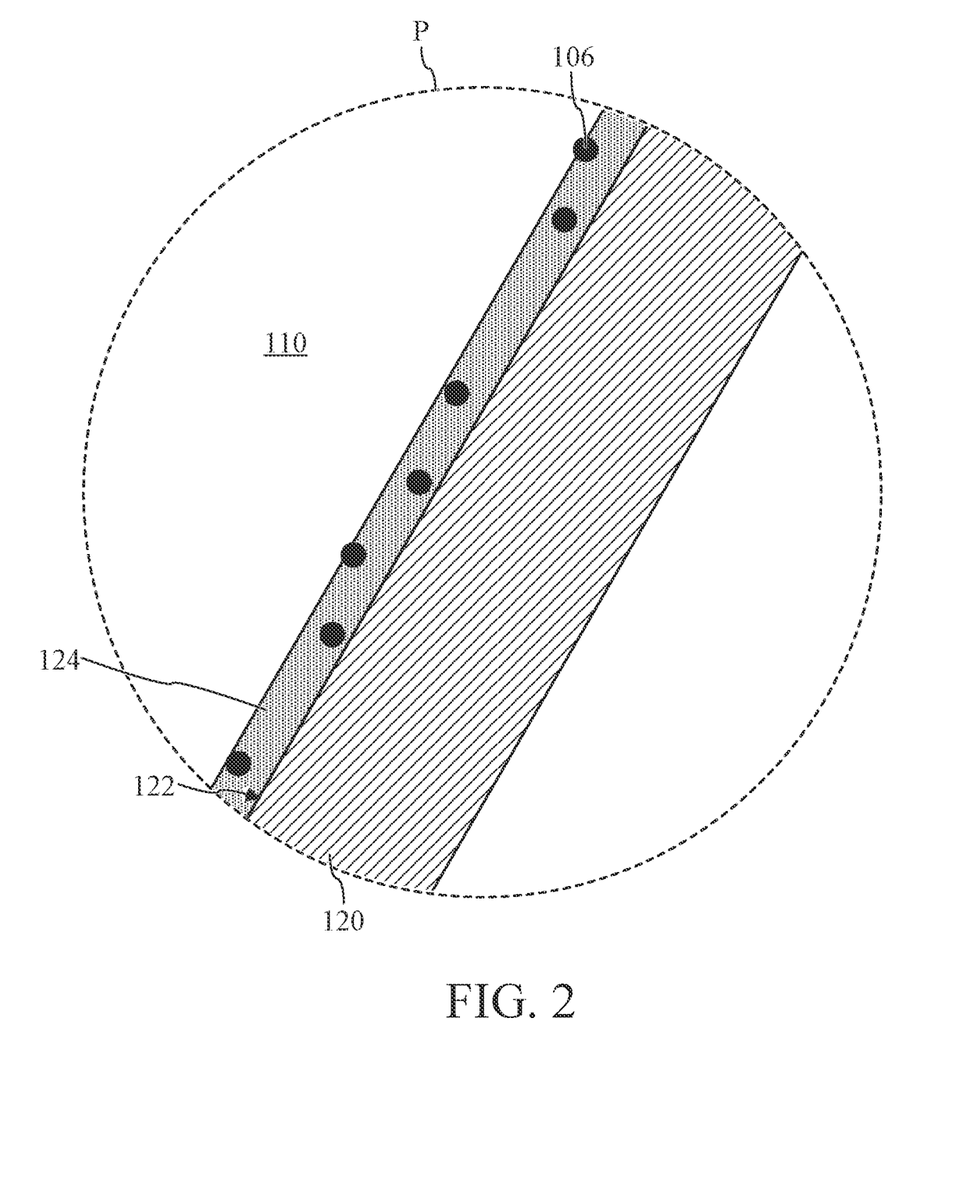
Figure 3:
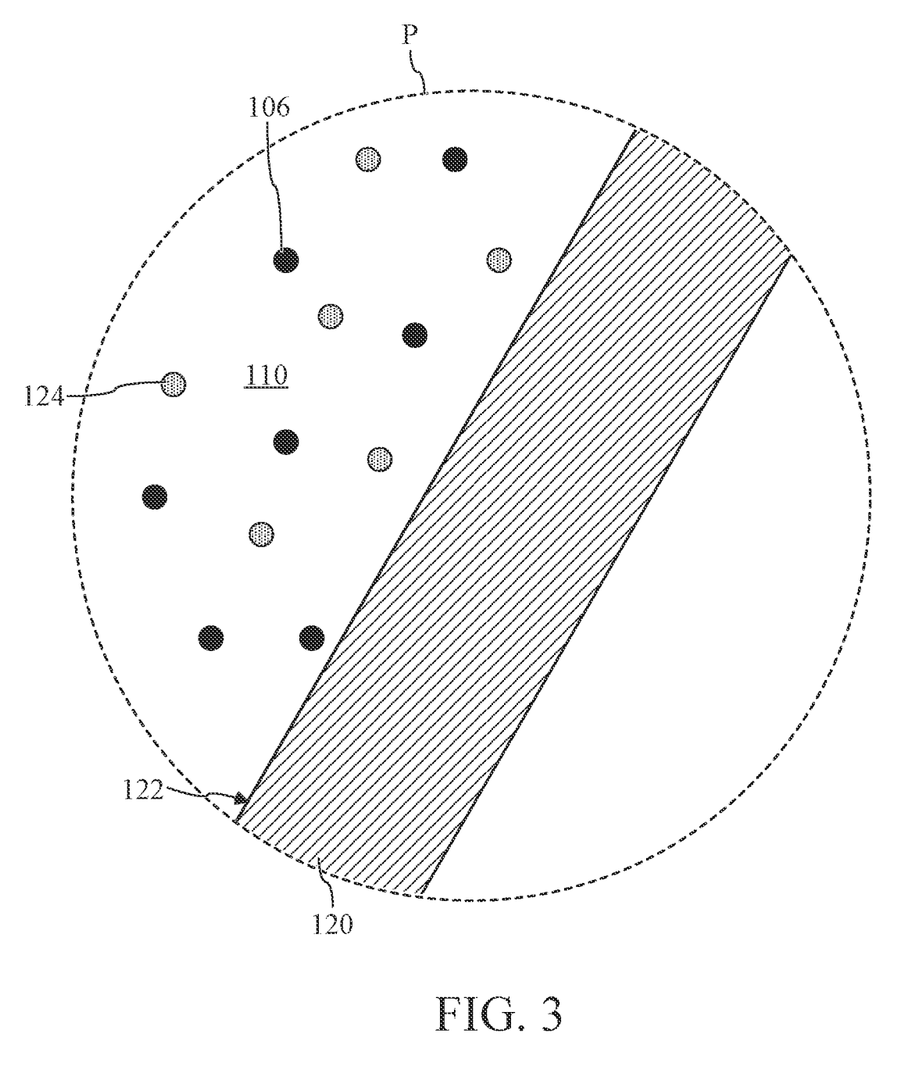

Turning to FIGS. 2 and 3, and with continued reference to FIG. 1, the process of detecting nanoparticles 106 using system 100 may be discussed. Initially, nanoparticles 106 may be generated within first cavity 104 of first vacuum chamber 102, as discussed herein. During this process, control system 136 may close first valve 118 to prevent the generated nanoparticles 106 from flowing between first vacuum chamber 102 and second vacuum chamber 108. During the nanoparticle 106 generation process, second valve 134 may also be closed. Second valve 134 may be closed to help regulate and/or control the temperature of particle collection component 120/particle collection medium 124. That is, while nanoparticles 106 are being generated within first vacuum chamber 102, second vacuum chamber 108 may be fluidly closed off from first vacuum chamber 102 and particle counter 130 in order for the temperature of particle collection component 120 and/or particle collection medium 124 may be regulated and/or established at a first temperature. The first temperature of particle collection component 120/particle collection medium 124 may establish and/or ensure particle collection medium 124 is in a solid phase. In the non-limiting example where particle collection medium 124 is water vapor, the first temperature of particle collection component 120 may be a predetermined temperature that cools the water vapor (e.g., medium 124) to a temperature below freezing (e.g., −100° C.). As shown in FIGS. 1 and 2, water vapor cooled to the first temperature may result particle collection medium 124 forming a thin layer of ice (e.g., solid phase) over first surface 122 of particle collection component 120. The temperature of particle collection component 120/particle collection medium 124 may be regulated or adjusted to the first temperature using control system 136. That is, and as discussed herein, control system 136 operably coupled to particle collection component 120, a heating/cooling device in communication with particle collection component 120 (not shown), and/or heating/cooling device 140 of system 100 may adjust the temperature of particle collection component 120 and/or particle collection medium 124 to establish and maintain particle collection medium 124 in the solid phase.

Once particle collection medium 124 is established and maintained at the first temperature and/or solid phase, and nanoparticles 106 are generated within first vacuum chamber 102, first valve 118 may be opened. More specifically, control system 136 may open first valve 118 subsequent to adjusting the temperature of particle collection component 120 to the first temperature to allow the plurality of nanoparticles 106 generated within first vacuum chamber 102 to flow from first cavity 104 of first vacuum chamber 102 to second cavity 110 of second vacuum chamber 108 via first conduit 112. To prevent nanoparticle 106 from undesirably leaving second vacuum chamber 108, control system 136 may maintain second valve 134 in a closed position. Additionally, control system 136 may maintain particle collection component 120/particle collection medium 124 at the first temperature to keep particle collection medium 124 in the solid phase.

As a result of particle collection medium 124 being maintained in the solid phase, nanoparticles 106 flowing into second vacuum chamber 108 may be encapsulated in particle collection medium 124. That is, solid phase particle collection medium 124 disposed over first surface 122 of particle collection component 120 and positioned directly adjacent to/aligned with first conduit 112 may encapsulate, receive, and/or embed nanoparticles 106 flowing from first vacuum chamber 102 therein. As shown in FIG. 2, the plurality of nanoparticles 106 flowing from first vacuum chamber 102 to second vacuum chamber 108 via first conduit 112 may be embedded and/or encapsulated directly into solid phase particle collection medium 124 and maintained therein while particle collection medium 124 is maintained in a solid phase.

After a predetermined period and/or once substantially all nanoparticles 106 are removed from first vacuum chamber 102 and encapsulated in particle collection medium 124, first valve 118 may be closed and second valve 134 may be opened. That is, control system 136 may close first valve 118 and open second valve 134 in order to prevent any nanoparticles 106 from flowing back into first vacuum chamber 102 and/or fluidly couple and prepare to allow nanoparticles 106 in second vacuum chamber 108 to flow to particle counter 130. The opening of second valve 134 may provide or create a pressure differential between second vacuum chamber 108 and particle counter 130, which in turn may pull nanoparticles 106 from second vacuum chamber 108 to particle counter 130 as discussed herein.

Simultaneous or subsequent to closing first valve 118 and opening second valve 134, the temperature of particle collection component 120/particle collection medium 124 may be adjusted to a second temperature. That is, in addition to closing first valve 118 and opening second valve 134, control system 136 may simultaneously or subsequently adjust the temperature of particle collection component 120 to a second temperature. The second temperature may be greater than the first (e.g., particle collection component 120 is heated), which in turn may heat or raise the temperature of particle collection medium 124. Additionally, the second temperature of particle collection component 120 may transition particle collection medium 124 from the solid phase to a gaseous phase—meaning particle collection medium 124 may undergo a sublimation process when particle collection component 120 is adjusted to the second temperature. In the non-limiting example where particle collection medium 124 is water vapor, the second temperature of particle collection component 120 may raise the temperature of the water vapor to below or equal to freezing to sublimate the water vapor (e.g., solid ice gaseous water vapor). In the example, the second temperature may be greater than the first temperature. Additionally, adjusting the temperature of particle collection component 120 to the second temperature and/or causing particle collection medium 124 to sublimate may result in the plurality of nanoparticles 106 encapsulated by particle collection medium 124 to aerosolize. That is, when particle collection medium 124 sublimates, nanoparticles 106 encapsulated therein may aerosolize, become air born, and/or may become suspended within second cavity 110 of second vacuum chamber 108. As shown in FIG. 3, particle collection medium 124 may be converted to a gaseous phase in second cavity 110 (compare, FIGS. 2 and 3) as result of adjusting the temperature and/or sublimating medium 124. As such, particle collection medium 124 may be suspended within second cavity 110 of second vacuum chamber 108. Additionally, and as shown in FIG. 3, the sublimation of particle collection medium 124 may also result in the release of nanoparticles 106 from medium 124 and/or the aerosolization of nanoparticles 106. In the non-limiting example, aerosolized nanoparticles 106 may be suspended within second vacuum chamber 108. As a result of opening second valve 134 and the pressure differential created therein, the aerosolized plurality of nanoparticles 106 may flow and/or be pulled from second vacuum chamber 108 to particle counter 130 via second conduit 132.

Additionally in the non-limiting example, and to aid in the movement or flow of aerosolized nanoparticles 106 from second vacuum chamber 108 to particle counter 130, sprayer 126 may provide a gas with second vacuum chamber 108. More specifically, and as the temperature of particle collection component 120 is adjusted to the second temperature, sprayer 126 may also provide a gas to particle collection component 120 to move (aerosolized) nanoparticles 106 from particle collection component 120 to be suspended within second cavity 110. The provided gas may provide a gaseous flow force on each of the plurality of (aerosolized) nanoparticles 106 and may aid in the separation of nanoparticles 106 from particle collection component 120 and/or may move aerosolized nanoparticles 106 from second vacuum chamber 108 to particle counter 130.

Once aerosolized nanoparticles 106 flow to particle counter 130 via second conduit 132, particle counter 130 may begin to detect or process nanoparticles 106. That is, particle counter 130 may detect, capture, count, and/or measure (e.g., determine a size or dimension) each of the plurality of aerosolized nanoparticles 106 that flow from second vacuum chamber 108 to particle counter 130 of system 100.

Figure 4:
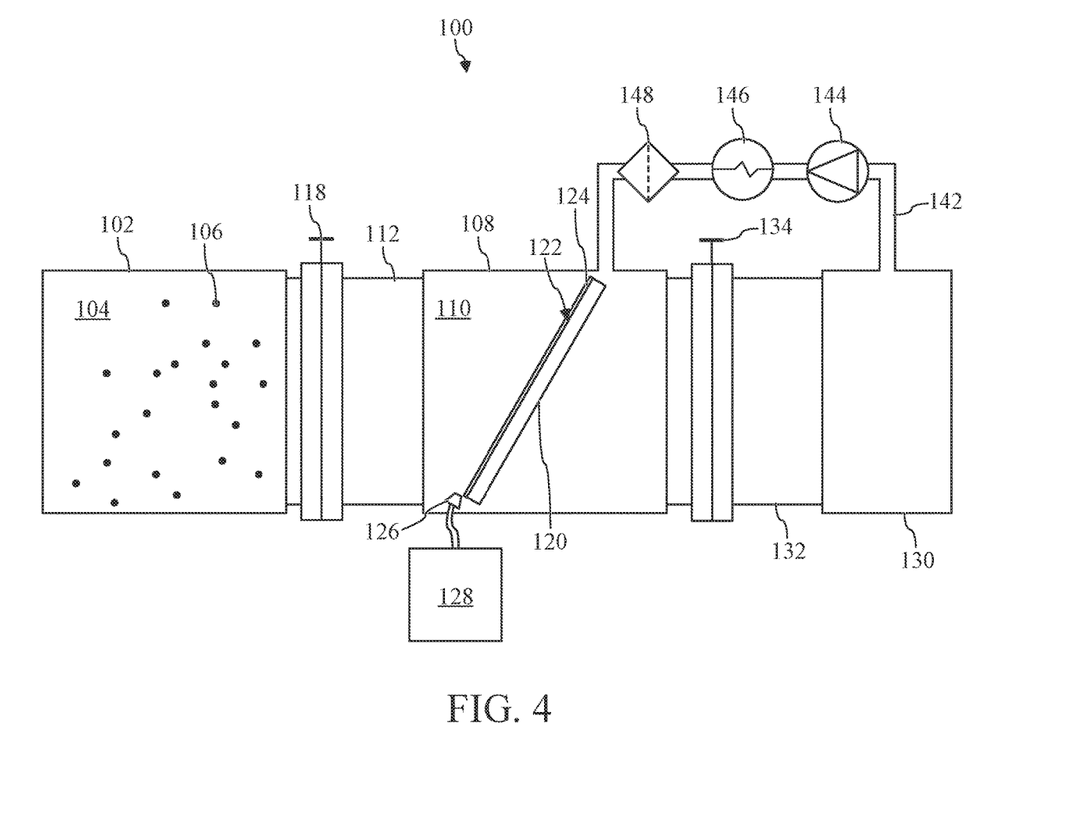

Turning to FIG. 4, another non-limiting example of system 100 is shown. Control system 136 has been omitted from the non-limiting example shown in FIG. 4 for the sake of brevity and/or clarity. Although not shown, it is understood that system 100 shown in FIG. 4 may include control system 136. Additionally, it is understood that similarly numbered and/or named components may function in a substantially similar fashion. Redundant explanation of these components has been omitted for clarity.

In the non-limiting example shown in FIG. 4, particle collection medium 124 may be formed from a distinct material than water vapor discussed herein with respect to FIGS. 1-3. In the example, particle collection medium 124 may be formed from a predetermined chemical compound that may undergo a sublimation process, as discussed herein. For example, particle collection medium may be formed as, but is not limited to, carbon dioxide ($CO_2$) or naphthalene ($C_{10}H_8$). Chemical compound forming particle collection medium 124 may be in a solid phase when particle collection component 120 is adjusted to the first temperature, and particle collection medium 124 may be sublimated and/or transitioned to a gaseous phase when particle collection component 120 is adjusted (e.g., heated) to the second temperature. In this non-limiting example, and distinct from water vapor discussed herein, the first temperature of particle collection component 120 may be adjusted such that the chemical compound forming particle collection medium 124 is in the solid phase at about room temperature (e.g., approximately 20° C.). Providing or disposing particle collection medium 124 on particle collection component 120 may include, for example, heating particle collection medium 124 to sublimate medium 124, and subsequently the vapor of particle collection medium 124 solidifies on particle collection component 120. Once solidified on particle collection component 120, particle collection medium 124 may entrap or receive nanoparticles 106, and subsequently undergo a (second) sublimation process that may vaporize particle collection medium 124 and/or aerosolize nanoparticles 106, as similarly discussed herein. Chemical compound forming particle collection medium 124 may encapsulate and subsequently aid in the aerosolization of nanoparticles 106 for detection, capturing, counting, and/or measuring, as similarly discussed herein with respect to FIGS. 1-3.

Additionally as shown in FIG. 4, system 100 may include a resupply conduit 142. Resupply conduit 142 may be in fluid communication and/or may fluidly couple particle counter 130 and second vacuum chamber 108. Resupply conduit 142 may be distinct from second conduit 132 of system 100. In the non-limiting example, resupply conduit 142 may recycle and/or resupply the chemical compound forming particle collection medium 124 from particle counter 130 to second vacuum chamber 108 subsequent to particle counter 130 detecting, capturing, measuring, and/or counting the aerosolized plurality of nanoparticles 106.

System 100 may include additional components that may aid in the recycling and/or resupplying of the chemical compound forming particle collection medium 124 via resupply conduit 142. for example, and as shown in FIG. 4, system 100 may include a pump 144 positioned on and/or in fluid communication with resupply conduit 142. Pump 144 may be positioned on resupply conduit 142 between particle counter 130 and second vacuum chamber 108. Pump 144 may flow the aerosolized plurality of nanoparticles 106 and the sublimated chemical compound farming particle collection medium 124 through resupply conduit 142 after nanoparticles 106 have been detected, captured, counted, and/or measured using particle counter 130.

System 100 may also include a condenser 146 in fluid communication with resupply conduit 142. Condenser 146 may be positioned between particle counter 130 and second vacuum chamber 108. Condenser 146 may be formed as any suitable device, component, and/or system that may be configured to condense sublimated chemical compound forming particle collection medium 124. Condensing the chemical compound may allow system 100 to reuse the chemical compound in subsequent particle detection processes, as discussed herein.

Additionally, and as shown in FIG. 4, system 100 may also include a filter 148. Filter 148 may be positioned on and may be in fluid communication with resupply conduit 142. Filter 148 may remove the aerosolized nanoparticles 106 from the chemical compound forming particle collection medium 124 within resupply conduit 142. The removal of nanoparticles 106 from the chemical compound prior to resupplying or recycling the chemical compound back into second vacuum chamber 108 may ensure that previously detected nanoparticles 106 are not undesirably redetected, recaptured, recounted, and/or remeasured during subsequent detection processes.

In the non-limiting example shown in FIG. 4, filter 148 may be formed directly adjacent second vacuum chamber 108, pump 144 may be formed directly adjacent particle counter 130, and condenser 146 may be formed between pump 144 and filter 148. However, it is understood that each of the various components included in resupply conduit 142 may be included in any order and/or other orders than those depicted in the non-limiting example shown.

Figure 5:
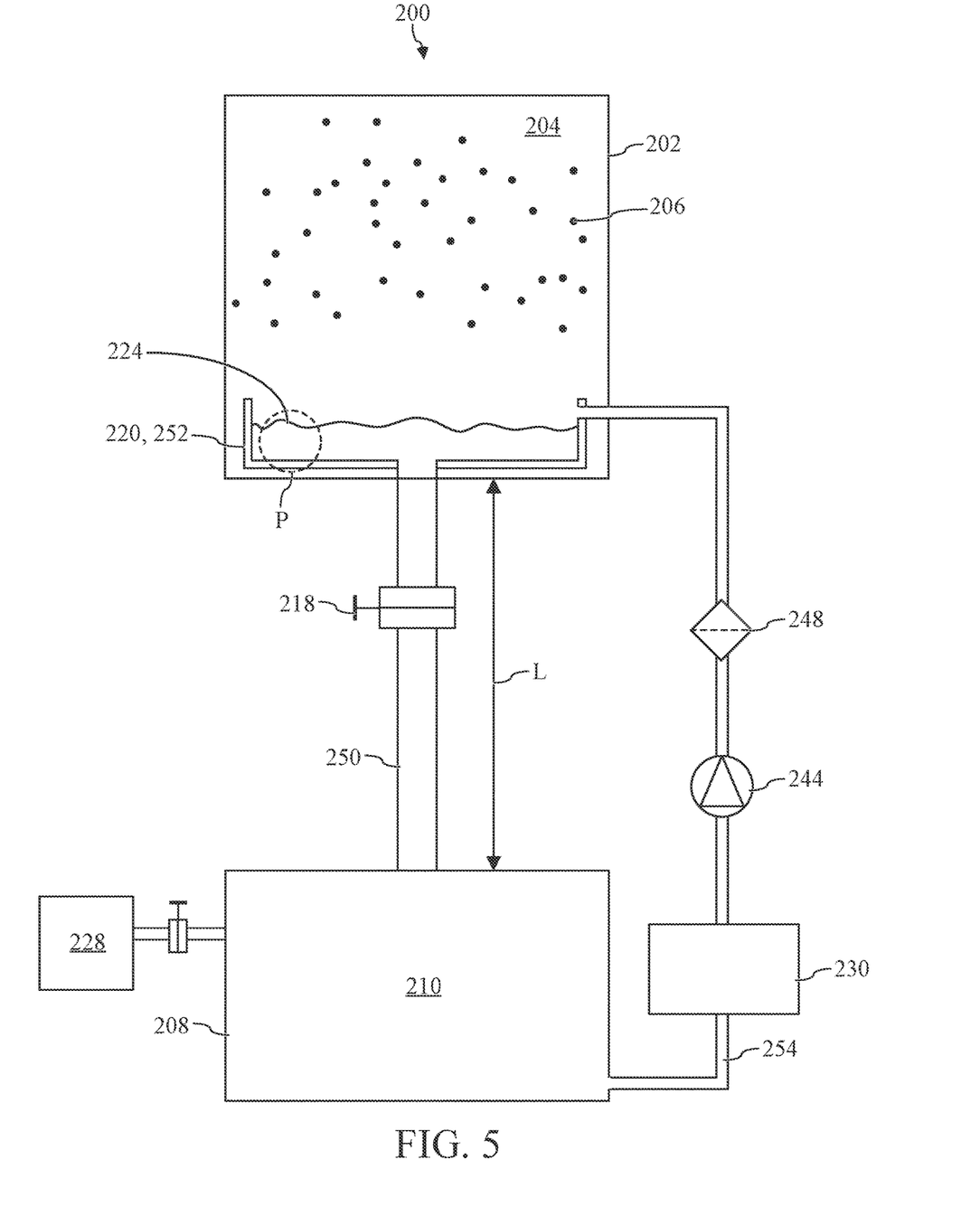
FIG. 5 shows a schematic view of system for detecting, capturing, and measuring particles using a liquid phase particle collection medium, according to embodiments of the disclosure.

FIG. 5 shows another non-limiting example of a system 200 for detecting particles. System 200 of FIG. 5 may include substantially similar components, portions, and/or device as those shown and discussed herein with respect to FIGS. 1-4. It is understood that similarly numbered and/or named components may function in a substantially similar fashion. Redundant explanation of these components has been omitted for clarity.

As shown in FIG. 5, system 200 may include a first vacuum chamber 202 including a first cavity 204, and a second vacuum chamber 208 including a second cavity 210, where the second vacuum chamber 208 is in fluid communication with first vacuum chamber 202. First vacuum chamber 202 and second vacuum chamber 208 may be substantially similar to first vacuum chamber 102 and second vacuum chamber 208 of system 100 of FIG. 1. Additionally, a plurality of nanoparticles 206 may be formed, included, and/or generated in first vacuum chamber 202 as similarly discussed herein. Redundant explanation of these components has been omitted for clarity.

Distinct however from system 100, first vacuum chamber 202 and second vacuum chamber 208 may include a predetermined configuration and/or orientation. That is, and as shown in FIG. 5, second vacuum chamber 208 may be positioned vertically below first vacuum chamber 202. As discussed herein, positioning second vacuum chamber 208 below first vacuum chamber 202 may allow for liquid phase particle collection medium 224 to flow freely, based on gravity, between first vacuum chamber 202 and second vacuum chamber 208 during the detection process.

As shown in FIG. 5 first vacuum chamber 202 and second vacuum chamber 208 of system 200 may be fluidly coupled via a gravity conduit 250. More specifically, gravity conduit 250 may be positioned/extend between and may fluidly couple first vacuum chamber 202 and second vacuum chamber 208 in system 200. As discussed herein, during operation gravity conduit 250 may provide particle collection medium 224 encapsulating the plurality of nanoparticles 206 from first vacuum chamber 202 to second vacuum chamber 208. Gravity conduit 250 may include a predetermined size and/or length (L). The predetermined length (L) of gravity conduit 250 may be based on, at least in part, the size or dimension of first vacuum chamber 202 and/or second vacuum chamber 208, as well as the internal pressures included in each chamber 202, 208. Predetermined length (L) may ensure that particle collection medium 224 may overcome the pressure change between first vacuum chamber 202 and second vacuum chamber 208 to allow (liquid) particle collection medium 224 encapsulating the plurality of nanoparticles 206 to flow between chambers 202, 208. Gravity conduit 250 may be formed from any suitable material that may aid in the flowing of nanoparticles 206 from first vacuum chamber 202 to second vacuum chamber 208.

System 100 may also include a valve 218. Valve 218 may be positioned on and/or may be in fluid communication with gravity conduit 250. As such, valve 218 may also be positioned or disposed between first vacuum chamber 202 and second vacuum chamber 208. As discussed herein, valve 218 may regulate the flow of nanoparticles 206 between first vacuum chamber 202 and second vacuum chamber 208 when performing processes for detecting nanoparticles 206 within system 200. That is, and as discussed herein, valve 218 may intermittently open to allow particle collection medium 224 encapsulating nanoparticles 206 to flow from first vacuum chamber 202 to second vacuum chamber 208. Valve 218 may be formed as any suitable valve or flow regulator device that may allow or prevent the flow of nanoparticles/particle collection medium from first vacuum chamber 202 to second vacuum chamber 208.

As similarly discussed herein, system 200 may also include a particle collection component 220. Particle collection component 220 may be positioned within first cavity 204 of first vacuum chamber 202. In the non-limiting example shown in FIG. 5, particle collection component 220 may be formed as and/or may include a container 252. As discussed herein, container 252 may receive particle collection medium 224 during the detection process. Additionally, container 252 forming particle collection component 220 may be in fluid communication and/or fluidly coupled with gravity conduit 250 to provide particle collection medium 224 to second vacuum chamber 208, as discussed herein.

Particle collection medium 224 may be disposed on particle collection component 220 of system 200. More specifically, particle collection medium 224 may be disposed on and/or disposed in particle collection component 220. In the non-limiting example where particle collection component 220 is formed as container 252, particle collection medium 224 may be disposed, contained, and/or housed within container 252. Distinct from particle collection medium 124 shown and discussed herein with respect to FIGS. 1-3, particle collection medium 224 may be formed as and/or be established in a liquid state or phase. That is, particle collection medium 224 and the material forming the same may be a liquid and/or may be in a liquid phase. Additionally, and distinct from system 100, particle collection medium 224 may not undergo a phase shift or change. That is, unlike particle collection medium 124 of system 100 which may undergo a sublimation process, particle collection medium 224 of system 200 may be maintained in a liquid phase throughout the detection process discussed herein. Particle collection medium 224 may be formed as any suitable liquid material that may encapsulate nanoparticles 206 therein, and may include predetermined characteristics or properties including, but not limited to, low volatility, low outgassing properties, and/or low viscosity. In a non-limiting example, liquid particle collection medium 224 may be formed as a heavy hydrocarbon pump oil.

Figure 6:
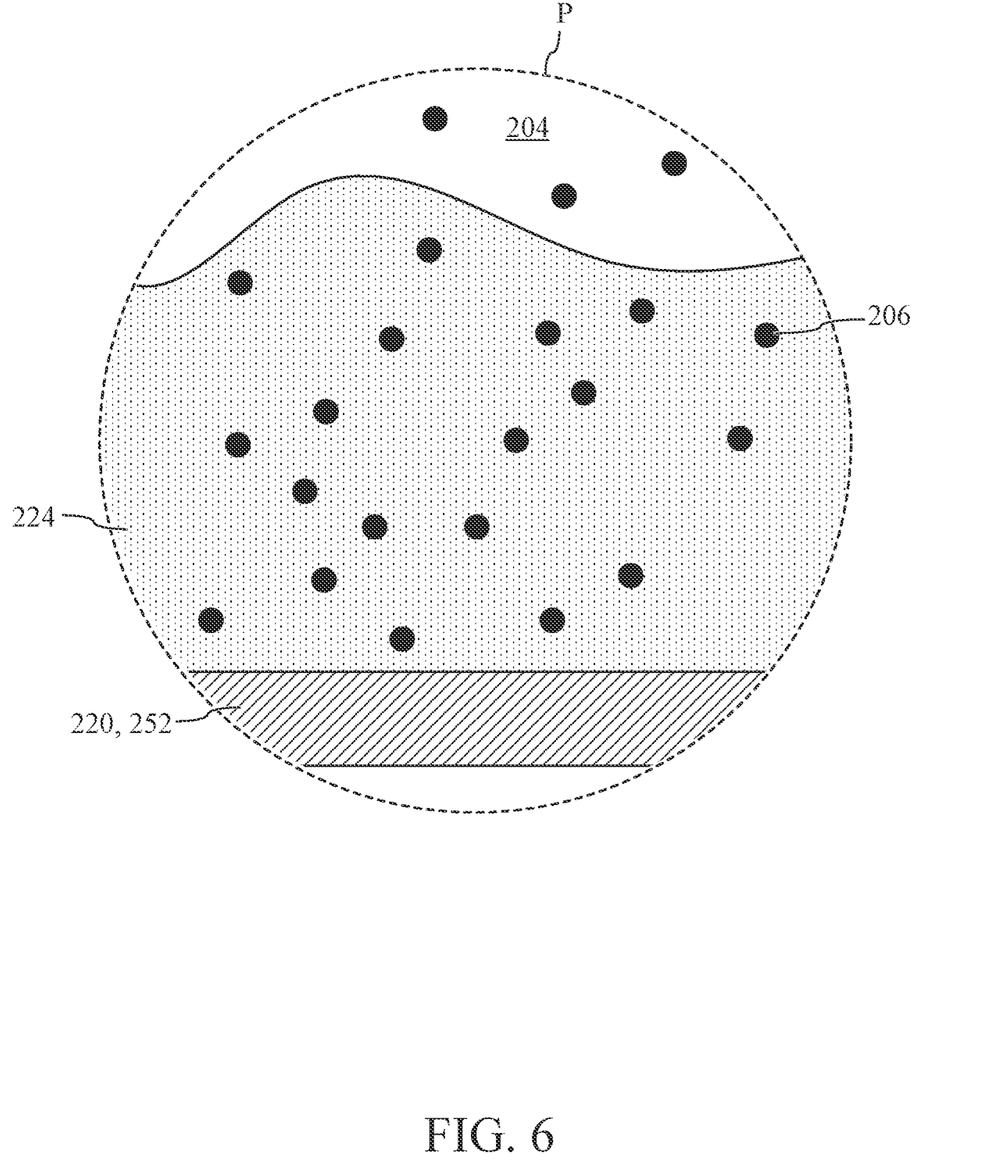
FIG. 6 shows an enlarged view of a portion of the system of FIG. 5 including a plurality of particles encapsulated in the liquid phase particle collection medium, according to embodiments of the disclosure.

Briefly turning to FIG. 6, an enlarged portion (P) of FIG. 5 is shown. In the non-limiting example, a plurality of nanoparticles 206 generated in first vacuum chamber 202 may be encapsulated, received, and/or embedded in liquid phase particle collection medium 224. Once encapsulated, nanoparticles 106 may remain within liquid phase particle collection medium 224 until after nanoparticles 206 are detected by particle counter 230 and subsequently discarded and/or filtered or removed from particle collection medium 224.

System 200 may also include supply reservoir 228. Supply reservoir 228 may be fluidly coupled and/or in fluid communication with second cavity 210 of second vacuum chamber 208. During the particle detection process discussed herein, supply reservoir 228 may provide, supply, fill, and/or pressurize second cavity 210 of second vacuum chamber 208 with a gas after particle collection medium 224 including encapsulated nanoparticles 206 flows therein. In non-limiting examples, the gas supplied by supply reservoir may include, but not limited to, nitrogen (N), argon (Ar), other inert gases, and/or air.

Returning to FIG. 5, system 200 may also include particle counter 230. In the non-limiting example shown in FIG. 5, particle counter 230 may be in fluid communication with second vacuum chamber 208. More specifically, particle counter 230 may be positioned on and may be in fluid communication with resupply conduit 254, which in turn may fluidly couple second vacuum chamber 208 to particle counter 230, as well as, first vacuum chamber 202. Particle counter 230 may be formed as any suitable device, system, and/or apparatus that may detect, count, and/or measure nanoparticles 206 encapsulated within liquid phase particle collection medium 224. In a non-limiting example, particle counter 230 may be capable of detecting, counting, and/or measuring nanoparticles 106 that are as small as approximately 25 nanometers (nm).

As discussed herein, system 200 may include a resupply conduit 254. Resupply conduit 254 may be in fluid communication and/or may fluidly couple first vacuum chamber 202 and second vacuum chamber 208. Resupply conduit 254 may be distinct from gravity conduit 250 of system 200. In the non-limiting example, resupply conduit 254 may recycle and/or resupply the liquid phase forming particle collection medium 224 from second vacuum chamber 208/particle counter 230 to first vacuum chamber 202 subsequent to particle counter 230 detecting, capturing, measuring, and/or counting the aerosolized plurality of nanoparticles 206. Additionally as shown in FIG. 5, an end or exit portion of resupply conduit 254 may extend through first vacuum chamber 202 and may be in fluid communication with container 252 forming particle collection component 220 positioned within first vacuum chamber 202.

System 200 may include additional components that may aid in the recycling and/or resupplying of liquid phase particle collection medium 224 via resupply conduit 254. For example, and as shown in FIG. 5, system 100 may include a pump 244 positioned on and/or in fluid communication with resupply conduit 254. Pump 244 may be positioned on resupply conduit 254 between particle counter 130 and first vacuum chamber 202. Pump 244 may flow the liquid phase particle collection medium 224 through resupply conduit 254 after nanoparticles 206 have been detected, captured, counted, and/or measured using particle counter 230.

Additionally, and as shown in FIG. 5, system 200 may also include a filter 248. Filter 248 may be positioned on and may be in fluid communication with resupply conduit 254. Filter 248 may remove nanoparticles 206 from liquid phase particle collection medium 224 flowing within resupply conduit 254. The removal of nanoparticles 206 from liquid phase particle collection medium 224 prior to resupplying or recycling back into first vacuum chamber 202/particle collection component 220 may ensure that previously detected nanoparticles 206 are not undesirably redetected, recaptured, recounted, and/or remeasured during subsequent detection processes.

Although not shown, system 200 may also include a valve positioned on and/or in fluid communication with resupply conduit 254. Valve included in resupply conduit 254 may be closed during certain portions of the processes for detecting nanoparticles 206 to maintain the vacuum pressure within first vacuum chamber 202 and/or second vacuum chamber 208.

It is understood that each of the various components included in resupply conduit 254 may be included in any order and/or other orders than those depicted in the non-limiting example shown, so long as particle counter 230 is positioned upstream of filter 248.

The process of detecting nanoparticles 206 using system 200 may be discussed. Initially, nanoparticles 206 may be generated within first cavity 204 of first vacuum chamber 202, as discussed herein. During this process, valve 218 may be closed to prevent the generated nanoparticles 206 from flowing between first vacuum chamber 202 and second vacuum chamber 208. Additionally, valve 218 may be closed to prevent liquid phase particle collection medium 224 included in container 252 from flowing through gravity conduit 250 to second vacuum chamber 208. As nanoparticles 206 are generated within first cavity 204 of first vacuum chamber 202, nanoparticles 206 may become embedded, received within, and/or encapsulated in liquid phase particle collection medium 224 housed or contained within container 252 forming particle collection component 220.

Once nanoparticles 206 are generated within first vacuum chamber 202 and encapsulated within liquid phase particle collection medium 224, valve 218 may be opened. More specifically, and after a predetermined period and/or after a substantial amount of nanoparticles 206 are generated and encapsulated, valve 118 may be opened, and particle collection component 220/container 252 in fluid communication with gravity conduit 250 may provide and/or flow liquid phase particle collection medium 224 including encapsulated nanoparticles 206 to second vacuum chamber 208. As discussed herein, liquid phase particle collection medium 224 including encapsulated nanoparticles 206 may flow from container 252 in first vacuum chamber 202 to second vacuum chamber 208 as a result of a gravity force being applied to liquid phase particle collection medium 224 and/or because second vacuum chamber 208 is positioned vertically below first vacuum chamber 202.

Once liquid phase particle collection medium 224 including encapsulated nanoparticles 206 flow to second vacuum chamber 208, valve 218 may be closed, and liquid phase particle collection medium 224 may subsequently be provided to particle counter 230 via resupply conduit 254. In the non-limiting example shown in FIG. 5, supply reservoir 228 of system 200 may provide a gas (e.g., inert gas) to second vacuum chamber 208 to pump, pressurize, and/or flow particle collection medium 224 including encapsulated nanoparticles 206 into resupply conduit 254 and/or to particle counter 230. Particle counter 230 may subsequently begin to detect or process nanoparticles 206. That is, particle counter 230 may detect, capture, count, and/or measure (e.g., determine a size or dimension) each of the plurality of nanoparticles 206 encapsulated within liquid phase particle collection medium 224. Once detected, liquid phase particle collection medium 224 including encapsulated nanoparticles 206 may be pumped through resupply conduit 254, and nanoparticles 206 may be filtered or removed from liquid phase particle collection medium 224. Once filtered, liquid phase particle collection medium 224 may be resupplied or recycled back into particle collection component 220/container 252 so another particle detection process may be performed.

Figure 7:
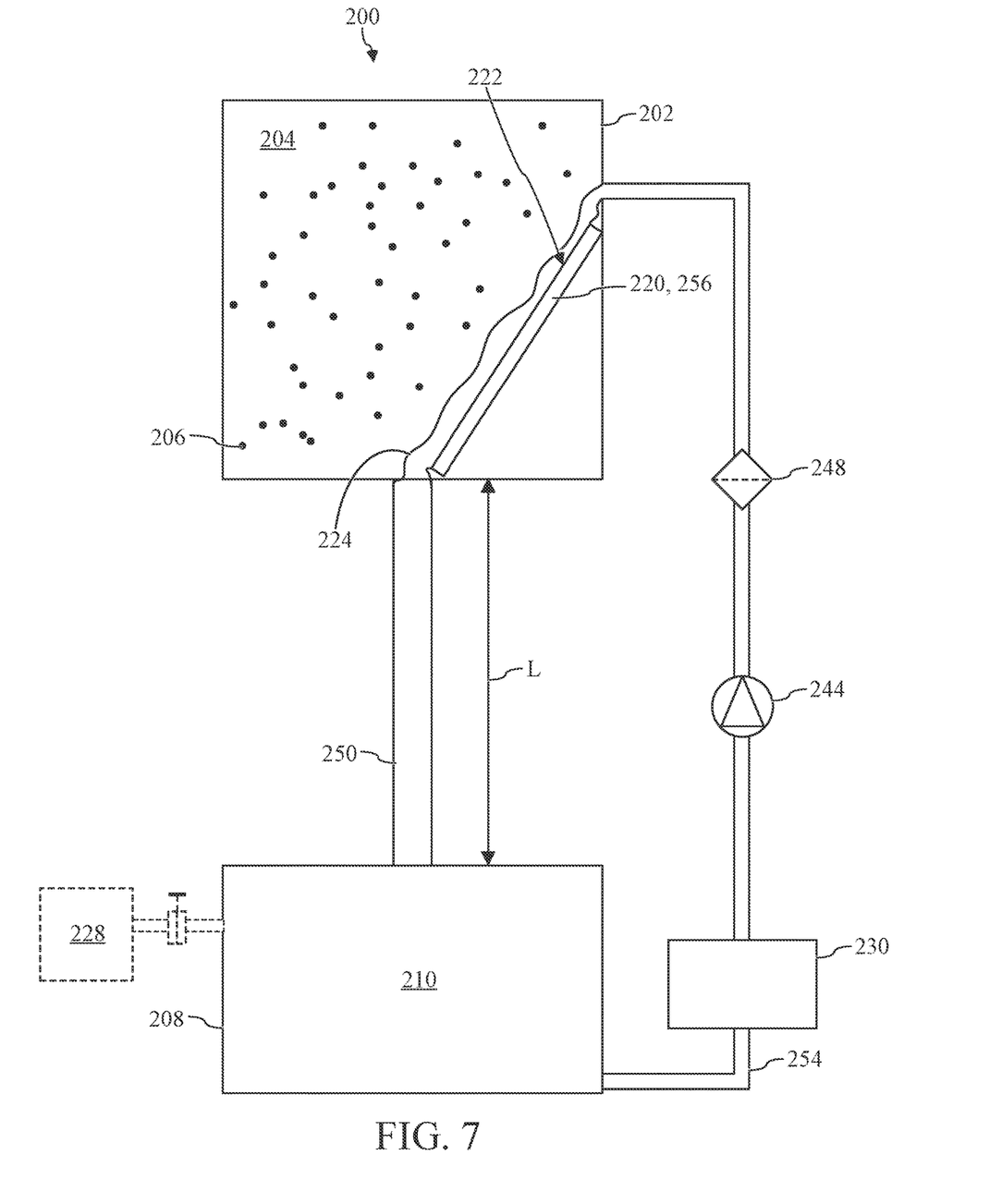
FIGS. 7 and 8 show schematic views of systems for detecting, capturing, and measuring particles using a liquid phase particle collection medium, according to further embodiments of the disclosure.
Figure 8:
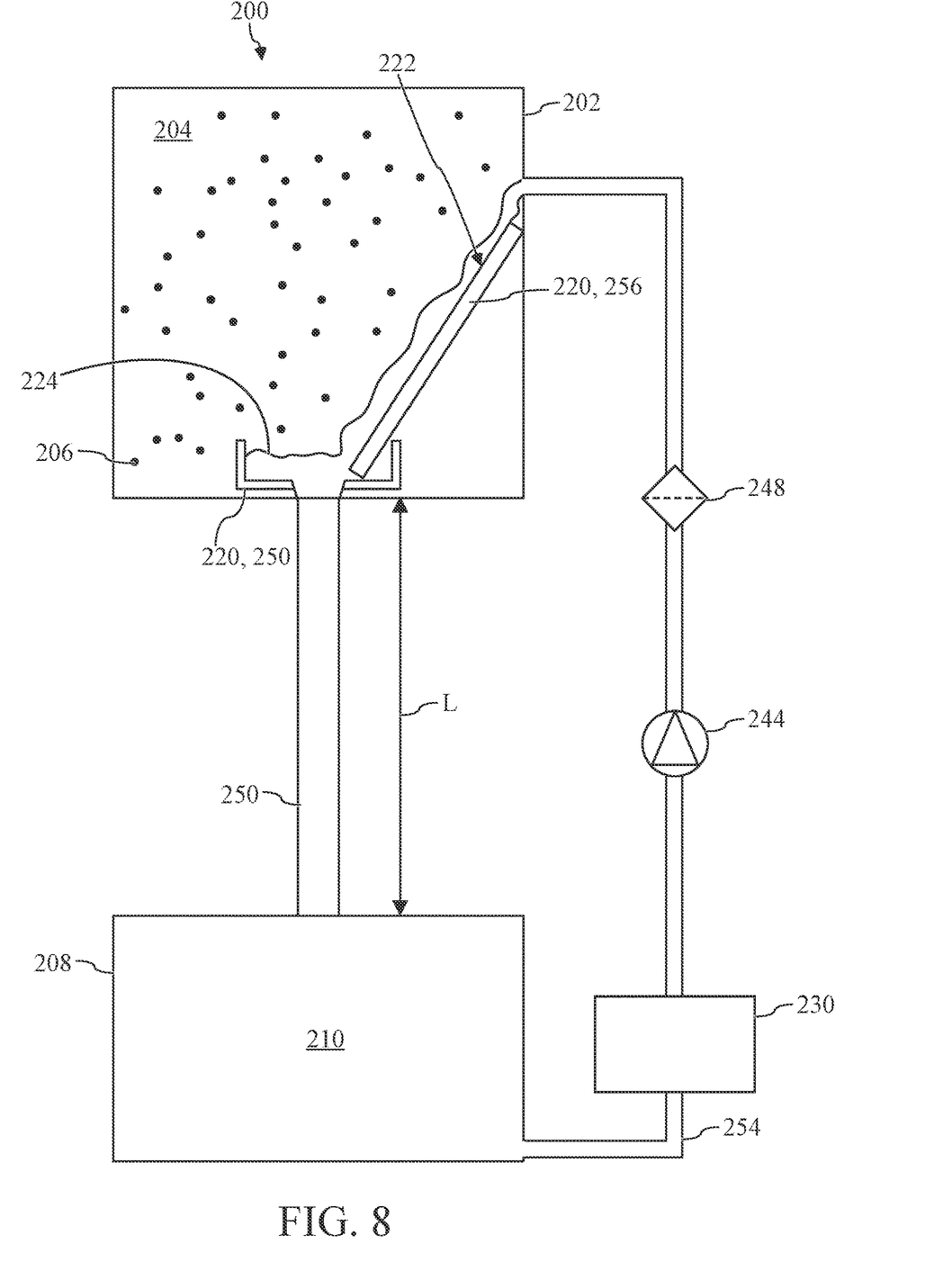

FIGS. 7 and 8 show additional, non-limiting examples of system 200 used to detect nanoparticles 206. It is understood that similarly numbered and/or named components may function in a substantially similar fashion. Redundant explanation of these components has been omitted for clarity.

In the non-limiting examples shown in FIGS. 7 and 8 particle collection component 220 may be formed as and/or may include a plate 256. Plate 256 may be angularly positioned within first cavity 204 of first vacuum chamber 202. That is, and as shown in the non-limiting example of FIG. 7, plate 256 may be angularly positioned within first cavity 204 such that one end of plate 256 is positioned adjacent an exit of resupply conduit 254 and a distinct/opposite end of plate 256 positioned directly adjacent and/or substantially aligned with gravity conduit 250. That is, the distinct end of plate 256 may be positioned directly adjacent gravity conduit 250 for providing particle collection medium 224 flowed over first surface 222 of plate 256 directly to gravity conduit 250.

Based on the positioning of plate 256 particle collection medium 224 may be disposed or flow over first surface 222 of plate 256 toward gravity conduit 250 to encapsulate nanoparticles 206 included within first cavity 204 of first vacuum chamber 202. Once particle collection medium 224 encapsulates nanoparticles 206 and flows off of plate 256, particle collection medium 224 may flow directly into gravity conduit 250, and subsequently to second vacuum chamber 208, particle counter 230, and resupply conduit 254. As shown in FIG. 7, and distinct from the non-limiting example shown in FIG. 5, system 200 may not include valve 218. As such, the process of detecting nanoparticles 206 using system 200 shown in FIG. 7 may be a continuous process where particle collection medium 224 including encapsulating nanoparticles 206 is continuously flowed through gravity conduit 250 to second vacuum chamber 208. Particle collection medium 224 may then be provided to particle counter 230, and finally to resupply conduit 254 (and the various components included therein), before being resupplied to first vacuum chamber 202 and/or disposed over plate 256 forming particle collection component 220. Alternatively, system 200 may include valve 218 on gravity conduit 250, which may intermittently open and close to performing the detection process in stages and/or as batches.

FIG. 8 shows another non-limiting example of system 200. In this non-limiting example, system 200 may include both angularly positioned plate 256 and container 250 forming particle collection component 220. As shown, container 250 may be positioned within first cavity 204 of first vacuum chamber 202 adjacent plate 256. Plate 256 may also be positioned adjacent to and/or at least partially positioned within container 250. In the example, container 250 may receive liquid phase particle collection medium 224 flowed over first surface of 222 of plate 256 and encapsulating nanoparticles 206, before providing particle collection medium 224 to gravity conduit 250. Additionally in the non-limiting example, and similar to container 250 discussed herein with respect to FIG. 5, particle collection medium 224 included within container 250 after being flowed over plate 256, but before being provided to gravity conduit 250, may encapsulate additional nanoparticles 206 included in first vacuum chamber 202. Similar to the non-limiting example shown in FIG. 7, system 200 of FIG. 8 may either continuously flow particle collection medium 224 for detection of nanoparticles 206, or alternatively, may include valve 218 on gravity conduit 250, which may intermittently open and close to performing the detection process in stages and/or as batches.

Figure 9:
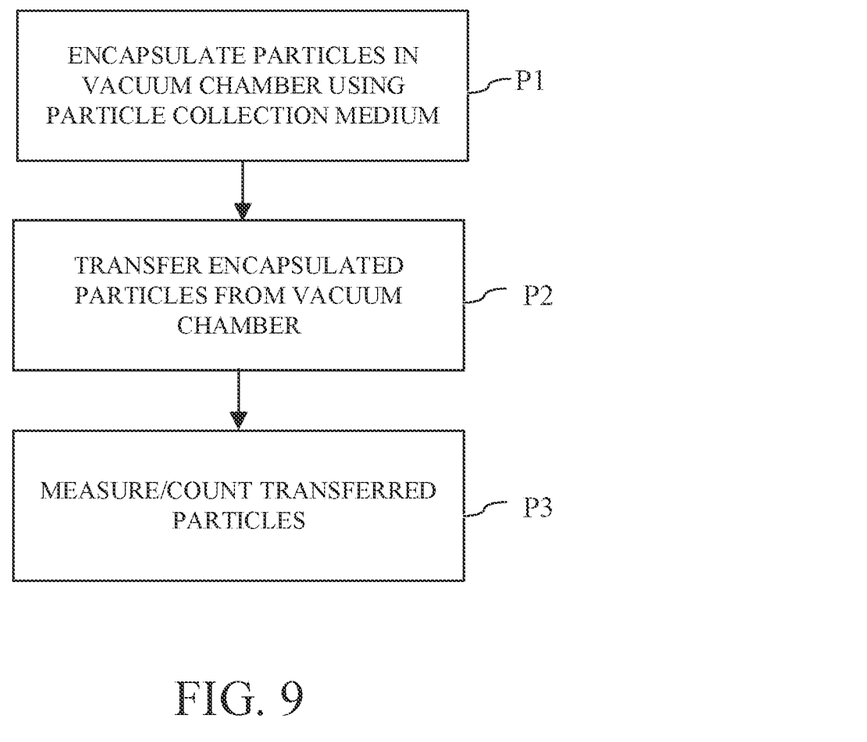
FIG. 9 shows a flowchart illustrating processes for detecting, capturing, and measuring particles, according to embodiments of the disclosure.

FIG. 9 depicts non-limiting example processes for detecting particles. Specifically, FIG. 9 includes a flowchart depicting various example processes for detecting, capturing, and/or measuring nanoparticles. In some cases, systems 100, 200 may be used to perform the processes for particle detection, as discussed herein with respect to FIGS. 1-8.

In process P1 a plurality of particles may be encapsulated. More specifically, a plurality of particles (e.g., nanoparticles) generated and/or included in a vacuum chamber may be encapsulated using a particle collection medium. In one non-limiting example, the particle collection medium may be in solid phase. In another non-limiting example the particle collection medium may be in a liquid phase.

In process P2 the encapsulated plurality of particles may be transferred from the vacuum chamber. That is, the encapsulated particles may be transferred, flowed, and/or removed from the vacuum chamber for additional processes and/or detection. In the non-limiting example where the particle collection medium is in a liquid phase, transferring the encapsulated particles may further include flowing the liquid phase particle collection medium including the encapsulated particles from the vacuum chamber to a distinct vacuum chamber and/or a particle counter. The liquid phase particle collection medium may be flowed from the vacuum chamber to a distinct vacuum chamber/particle counter using a gravity force and/or by positioning the distinct vacuum chamber/particle counter vertically below the vacuum chamber where the particles are formed/generated.

In another non-limiting example where the particle collection medium is in a solid phase, transferring the encapsulated particles may further include sublimating the solid phase particle collection medium including the encapsulated particles, and aerosolizing the plurality of particles encapsulated in the solid phase particle collection medium. Aerosolizing the plurality of particles may result in the particles being suspended in the cavity of the vacuum chamber. Once sublimated/aerosolized, transferring the encapsulated particles may also include providing a vacuum force to pull and/or providing a gaseous flow force to push or blow the plurality of aerosolized particles suspended in the vacuum chamber out of the vacuum chamber. In non-limiting examples, the aerosolized particles may be pulled/pushed to a particle counter for additional processing.

In process P3, the transferred particles may be detected. More specifically, the transferred, encapsulated particles may be detected, counted, and/or measure. The particles may be detected, counted, and/or measured using a particle counter. In the non-limiting example where the particles are included or remain encapsulated in the liquid phase particle collection medium, the particle counter may detect, count, and/or measure the particles included within the liquid phase particle collection medium. Conversely in the example where the particles are aerosolized, the particle counter may detect, count, and/or measure the aerosolized/suspended particles free from the now gaseous phase particle collection medium.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A particle detection system, the system comprising:
a first vacuum chamber including a first cavity, wherein a plurality of nanoparticles are formed inside the first cavity of the first vacuum chamber;
a second vacuum chamber in fluid communication with the first vacuum chamber, the second vacuum chamber including a second cavity;
a particle collection component positioned within the second cavity of the second vacuum chamber, the particle collection component including a first surface;
a particle collection medium disposed over the first surface of the particle collection component, the particle collection medium in a solid phase encapsulating the plurality of nanoparticles as the plurality of nanoparticles travel to the second vacuum chamber from the first vacuum chamber; a particle counter in fluid communication with the second vacuum chamber; and
a control system operably coupled to the particle collection component, the control system configured to aerosolize the plurality of nanoparticles by:
adjusting a temperature of the particle collection component to a first temperature, the first temperature establishing the particle collection medium in the solid phase; and adjusting the temperature of the particle collection component to a second temperature, the second temperature transitioning the particle collection medium from the solid phase to a gaseous phase.

2. The system of claim 1, wherein adjusting the temperature of the particle collection component to the second temperature aerosolizes the plurality of nanoparticles encapsulated by the particle collection medium by suspending the nanoparticles into the second cavity of the second vacuum chamber.

3. The system of claim 2, further comprising:
a first conduit fluidly coupling the first vacuum chamber and the second vacuum chamber; and
a second conduit fluidly coupling the second vacuum chamber and the particle counter.

4. The system of claim 3, further comprising:
a first valve in fluid communication with the first conduit, the first valve regulating the travel of the particles between the first vacuum chamber and the second vacuum chamber; and
a second valve in fluid communication with the second conduit, the second valve regulating the flow between the second vacuum chamber and the particle counter.

5. The system of claim 4, wherein the control system is operably coupled to the first valve and the second valve, respectively, the control system configured to:
open the first valve and close the second valve subsequent to adjusting the temperature of the particle collection component to the first temperature to allow the plurality of nanoparticles to travel from the first cavity of the first vacuum chamber to the second cavity of the second vacuum chamber via the first conduit; and
close the first valve and open the second valve prior to or simultaneous with adjusting the temperature of the particle collection component to the second temperature, the opening of the second valve allowing the aerosolized plurality of nanoparticles to flow from the second vacuum chamber to the particle counter via the second conduit.

6. The system of claim 1, further comprising a sprayer positioned within the second cavity of the second vacuum chamber, adjacent the particle collection component, the sprayer providing a gas to the particle collection component to move an aerosolized plurality of nanoparticles from the particle collection component.

7. The system of claim 1, wherein:
the particle collection medium includes water vapor,
the first temperature of the particle collection component cools the water vapor to a temperature below freezing, and
the second temperature of the particle collection component raises the water vapor to a temperature below or equal to freezing to sublimate the water vapor,
wherein the second temperature is greater than the first temperature.

8. The system of claim 1, wherein:
the particle collection medium is a predetermined chemical compound,
the first temperature of the particle collection component is associated with maintaining the chemical compound in the solid phase, and
the second temperature of the particle collection component is associated with sublimating the chemical compound into a gaseous phase.

9. The system of claim 8, further comprising:
a resupply conduit in fluid communication with the particle counter and the second vacuum chamber, the resupply conduit recycling the chemical compound from the particle counter to the second vacuum chamber subsequent to the particle counter detecting the aerosolized plurality of nanoparticles;
a pump in fluid communication with the resupply conduit, between the particle counter and the second vacuum chamber, the pump flowing the aerosolized plurality of nanoparticles and the sublimated chemical compound through the resupply conduit;
a condenser in fluid communication with the resupply conduit, the condenser converting the sublimated chemical compound to one of the solid phase or a liquid phase; and
a filter in fluid communication with the resupply conduit, the filter removing the aerosolized plurality of nanoparticles from the chemical compound within the resupply conduit.

* * * * *